April 28, 1953 A. M. MELDRUM 2,636,746
VEHICLE WITH ELEVATING BED
Filed May 16, 1947 2 SHEETS—SHEET 1

INVENTOR
ALASTAIR M. MELDRUM
BY Boykin, Mohler & Beckley
ATTORNEYS

April 28, 1953      A. M. MELDRUM      2,636,746
VEHICLE WITH ELEVATING BED
Filed May 16, 1947      2 SHEETS—SHEET 2
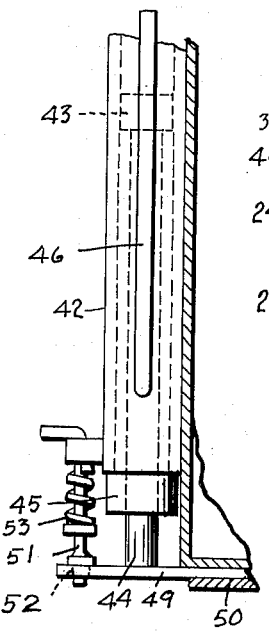
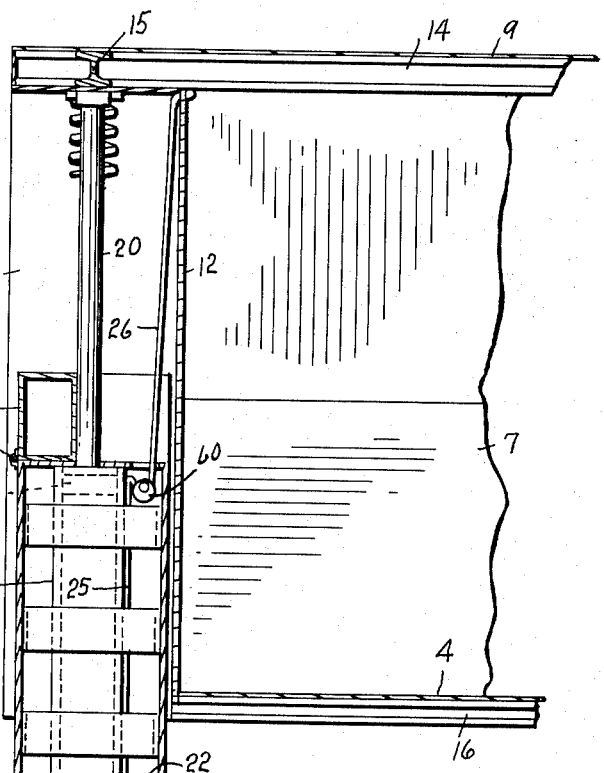
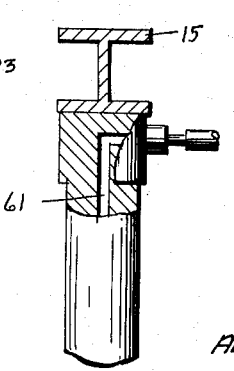
INVENTOR
ALASTAIR M. MELDRUM
BY
ATTORNEYS Patented Apr. 28, 1953

2,636,746

UNITED STATES PATENT OFFICE 2,636,746

VEHICLE WITH ELEVATING BED

Alastair M. Meldrum, San Francisco, Calif.

Application May 16, 1947, Serial No. 748,431

5 Claims. (Cl. 280—44)

This invention relates to vehicles of the type having an elevating bed.

In the transportation of freight or goods of any kind it usually happens that the goods are loaded and unloaded from the vehicle at different levels. The goods might be loaded from the ground or curb height and then unloaded onto a platform or freight car that is some thirty to fifty inches above the level of the ground or vice versa. This involves the expenditure of considerable time, and in many instances it also requires the use of additional costly equipment in extra help.

Certain types of vehicles have been devised for raising and lowering a vehicle bed between about ground and axle heights, and others have employed parallel sets of levers combined with hydraulic means for swinging the bed from about axle height upwardly.

In the case where movement is limited between almost axle height and the ground, no particular advantage is gained over low-bed trucks in which the bed is fixed at about axle height, since hand or power operated trucks can usually run over a ramp onto or off the bed.

Where the bed swings on lever arms, the bed must swing in an arc thus displacing the same laterally relative to a fixed platform with each inch of rise or fall, which is impractical and undesirable, and in none of the instances of which I am aware will the bed go to the ground.

One of the principal objects of the present invention is the provision of a vehicle that is adapted for movement over the highway or streets and the bed of which may be raised vertically, without side motion, from the ground to say about the height of the floor of a boxcar or about forty to fifty inches, and lowered from said height to the ground, in either instance with a full load, and which bed may be held at any distance between the ground and its highest level during loading or unloading.

Another object of the invention is the provision of a freight carrying trailer that has a bed adapted to be raised and lowered directly vertically relative to the ground and which bed is adapted to be maintained level during the raising and lowering operation.

A still further object of the invention is the provision of a vehicle having a bed that is suspended within an enclosed vertically positioned frame and which frame is connected with power means for moving the same sufficiently to elevate the bed substantially above the axis of the ground wheels of the vehicle and for lowering the bed to a distance below said axis.

An additional object of the invention is the provision of a trailer that is adapted to be removably secured and supported at its front end on a tractor, and that is supported on ground wheels at its rear end, and which vehicle includes means for directly raising and lowering its bed vertically independently of support from the tractor to different levels and for supporting said bed level at said different levels.

Other objects and advantages will appear in the description and in the drawings.

In the drawings,

Fig. 5 is a vertical sectional view through one of the elevating means with the body shown elevated.

Fig. 6 is an enlarged fragmentary view of another of the elevating means including a latch.

Fig. 7 is an enlarged fragmentary view of another manner of injecting liquid into the hydraulic cylinders than is shown in Fig. 5.

Figure 1:
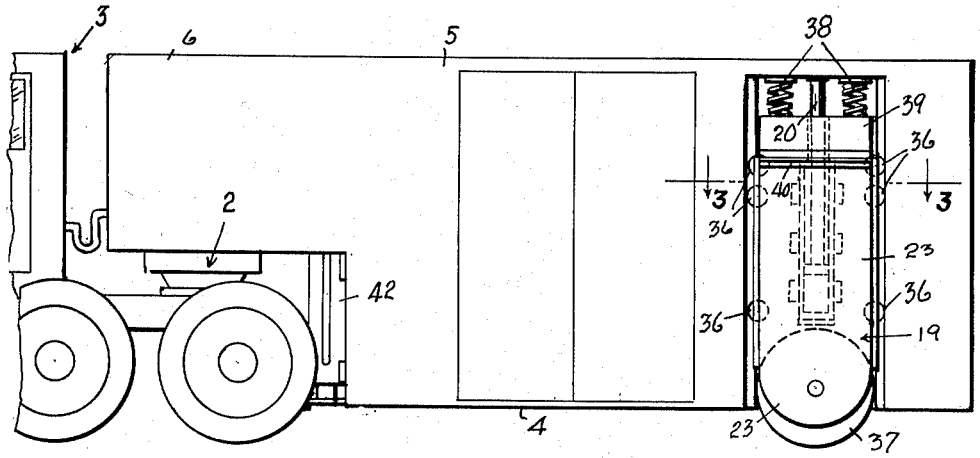
Fig. 1 is a side elevational view of a tractor illustrative of the invention, the bed of the trailer being in its normal position.

In detail, the vehicle illustrated herein comprises a trailer having a conventional turntable coupling means 2 at its forward end for connecting the same to a tractor 3 for pulling the trailer.

The trailer has a body that includes a bed 4 on which the load is carried and opposed side walls 5 and an elevated forward end portion 6 that is over the turntable, while a front wall 7 extends downwardly from said forward end to the bed. A top wall 9 forms the upper side of the body.

The opposite sides of the body adjacent the rear end of the trailer are formed with outwardly opening vertically extending channels each having sides 11 and a bottom 12. The sides 11 are each provided with a vertical track 13 projecting into the channel.

Extending across the top of the trailer inside the body is a pair of parallel beams 14 (Fig. 2) the ends of which extend over the upper ends of the channel elements 11, 12 and a connecting member 15 (Fig. 5) over said channels connects each pair of corresponding ends of said beams. The channel elements 11, 12 are rigidly secured to the beams 14, as by welding, and the lower ends of the bottoms 12 of the channels are connected by one or more cross beams 16 that extend below the floor 4 of the trailer. Thus beams 14, 16 and the elements of the channels at opposite sides of the trailer will form a rectangular closed frame with the bottom 12 supported therein on the lower side of said frame.

Centrally secured to each of the members 15 respectively positioned at the top of each channel in the sides of the trailer is the upper end of a vertically disposed piston rod 20 (Figs. 1, 5). Each rod 20 extends downwardly within the channel in which it is positioned and into a cylinder 21 that is secured at its lower end to a horizontal support 22 that is within a box-like carriage 19 and which support is secured to opposite sides 23 (Fig. 5) of said carriage.

Fluid under pressure, preferably liquid, is adapted to enter cylinders 21 at their lower ends below the piston 24 in each cylinder, such fluid being conducted thereto through a duct or pipe 25 extending alongside each cylinder. The upper end of each such pipe is connected by a high pressure flexible hose 26 with pipes 27 (Fig. 2), having two-way valves 28 therein for admitting the liquid to the cylinders from a reservoir 29, or for passing the liquid back into the reservoir from the cylinders. A conventional independently actuatable pump 30 may be in each of the lines 27 for forcing the liquid under pressure into the cylinders as desired, such pumps being adapted to be selectively driven by any suitable source of power 32 through conventional power transmission means.

The other two opposite sides of each carriage 19 are designated 35 and each carries centrally grooved rollers 36 that engage tracks 13, the latter being carried by sides 11 of the channels that are in the sides of the trailer body.

Frame members extend between the walls 23 and are secured thereto and to each cylinder 21. Thus the cylinders are rigidly secured to each carriage 19 so that the body of the vehicle will move up and down with respect to the carriage 19, the latter being held in alignment with the body by rollers 36 and tracks 13.

Carried within the lower end of each carriage 19 are the ground wheels 37 that project below said carriages. These wheels may be single or dual wheels. Dual wheels 37 on each carriage are shown in the drawings. The wheel axles may be secured to sides 23 of the carriage.

Figure 4:
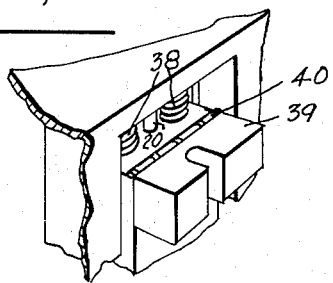
Fig. 4 is a fragmentary perspective view showing one of the spacer blocks swung out to permit the bed to lower to the ground.
Figure 3:
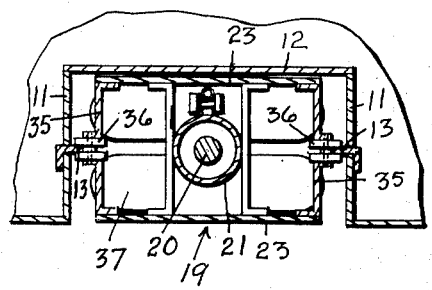
Fig. 3 is an enlarged sectional view taken along line 3—3 of Fig. 1.

Within the upper end of each channel in which each carriage 19 is adapted to move is a pair of heavy coil springs 38 and the upper end of each carriage carries a filler block 39 that is adapted to swing on hinge 40 from a position over the carriage between the latter and said springs to a position outside the channel as seen in Fig. 4.

When each block 39 is within the channels, as seen in Fig. 1, and the valves 28 are turned to exhaust the liquid in each cylinder 21 into the reservoir 29, the weight of the trailer and load is transmitted to the ground wheels 37 through springs 38 that rest on blocks 39. In this position the bed 16 is relatively low. However, when the blocks 39 are swung to the position seen in Fig. 4 and valves 28 are turned to exhaust the liquid from cylinders 21, the bed 4 may be lowered until it is on the ground.

At the forward end of the trailer and secured to forward wall 7 of the trailer is a hydraulic cylinder 42 (Fig. 6) having a piston 43 reciprocable therein. Piston 43 has a heavy piston rod 44 that extends downwardly through any suitable packing gland 45. A pipe 46 opens at opposite ends into cylinder 42 above and below the piston at opposite ends of the stroke of the latter and a reversible liquid pump 47 in pipe 46 driven by any suitable source of power 48 is adapted to pump the liquid into either one end of the cylinder or the other for extending or retracting the piston rod as desired. It is understood that the pipe 46 and cylinder are filled with the liquid that is withdrawn from one end and pumped into the other end upon actuation of the pump in the same manner as conventional reciprocable pistons in hydraulic hoists and dump trucks.

The piston rod 44 is heavy and when held in the retracted position the lower end is about even with the floor of the trailer. While the rod 44 may be held in elevated position by the oil or liquid in the cylinder, it is preferable that it also be mechanically held retracted against accidental extension and for this purpose a horizontal plate 49 is reciprocable in guideways 50 on the body for extension to a position below the piston (Fig. 6) and said plate is releasably held in this position by a spring urged latch 51 that is mounted on the cylinder 42 and that extends through an opening 52 in plate 49. Spring 53 tends to urge the latch downward for holding it in opening 52 and the same is adapted to be lifted and the plate 49 retracted whenever it is desirable to extend the rod 44.

In operation, assuming a heavy load on the ground is to be loaded onto the trailer, the operator merely actuates pumps 30 when valves 28 are open for pumping fluid into the cylinders 21 thereby lifting the weight of the body and bed off the springs 38. Pump 47 is also actuated for pumping fluid into cylinder 42 above piston 43 to extend rod 44 downwardly to the ground and to lift the front end of the trailer off the tractor, after which the tractor is withdrawn from below said front end. The filler blocks 39 are then swung outwardly to the position shown in Fig. 4 and upon reversing pump 47 and stopping pumps 30 and turning the valves 28 to exhaust the fluid in lines 27 into reservoir 29, the bed will be lowered to the ground and will rest on the ground.

Figure 2:
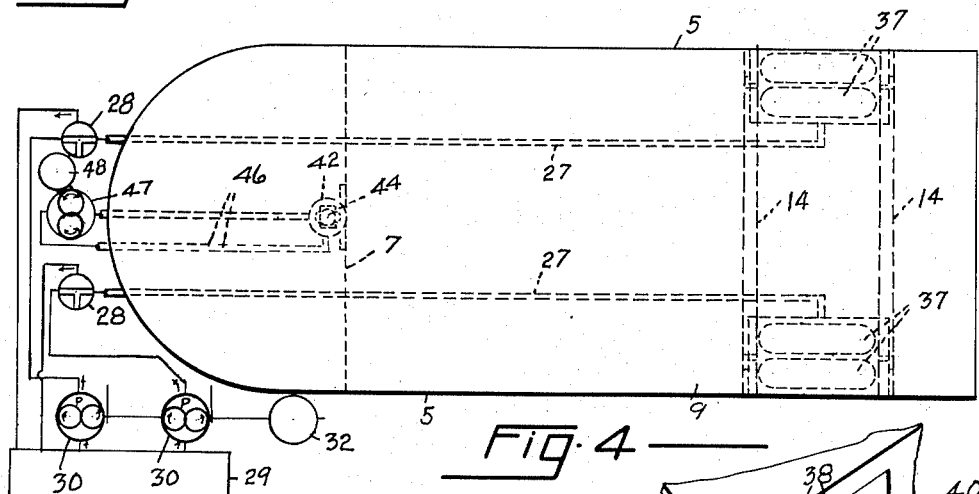
Fig. 2 is a plan view of the trailer of Fig. 1 with a control system diagrammatically shown.

After the load is placed on the bed, valves 28 are restored to the positions shown in Fig. 2 and pumps 30, 47 are actuated to pump fluid into the cylinders 21, 42 below piston 24 and above pistons 43 thus elevating the body to the desired level for connection with the tractor 3 and for swinging filler blocks back into place between the carriages 19 and springs 38. The pumps may then be stopped and the body lowered by manipulation of valves 28 and reversal of pump 47 to permit the springs 38 and tractor to take the load.

As soon as the springs 38 and tractor 3 take the load that is on the trailer, the rod 44 may be elevated to the position shown in Fig. 6 above plate 49 and the latter secured below said plate and the tractor will be ready to pull the trailer to its destination for unloading. The pumps 47, 30, will, of course, be stopped when the trailer is elevated the desired distance and is coupled to the tractor.

Assuming the destination is a box car, the bed of which is at a substantial elevation above bed 4, the operator will cause actuation of pumps 28, 47 for elevating the bed to the level of the box car, thus permitting the load to be trucked directly from the bed 4 into the car.

It is obvious, of course, that the bed 4 may be elevated or lowered to any desired level between the ground and the maximum extended stroke of the piston rods 20, 44 which is usually about 40 inches or the level of the floor of a box car. It is also seen that the bed may be maintained level during raising thereof, even if the trailer is not level itself, which is essential. Also it is seen that the body is raised directly vertically.

The fact that there are no through axles on the ground wheels enables the truck body to be moved all the way to the ground, and the provision of the leg or piston rod 44 enables leveling the body and maintaining it level during elevation and lowering of the body. Where a slant of the floor of the trailer is not objectionable, and there is no objection to keeping the trailer connected with the tractor during loading, the pump 47 need not be actuated, and only the rear end of the trailer need be raised and lowered.

The flexible lines 26 may be automatically retracted into carriages 19 by any suitable means such as weights 60 that slide or roll along the hose in the return bend thereof as the body is lowered from the elevated position shown in Fig. 5. This means is common for maintaining hose during retraction into a pit or the like.

While the piston rod 44 is indicated with a blunt lower end, the latter may carry any desired element such as a shoe or wheel. Inasmuch as the trailer illustrated is not usually moved unless the body is lowered onto a tractor, the blunt lower end of the piston rod 44 serves to hold the trailer against movement during loading or unloading when the bed is off the ground and the trailer is disconnected from the tractor.

In certain instances it has been found desirable to eliminate the flexible hose 26 and in those instances each piston rod 20 is formed with a central passageway 61 (Fig. 7) that extends through the piston and opens into the space below the latter. The pipes 27 connect with the upper ends of said piston rods by any suitable fittings.

It is to be understood that the detailed description and drawings are not to be considered restrictive of the invention but are merely illustrative of a preferred form thereof.

I claim:

1. A vehicle of the character described comprising a horizontal bed, oppositely outwardly opening vertically extending channel members respectively rigidly secured at their lower ends to said bed at opposite points along the two opposite side edges of said bed with the bottoms of said channel members in opposed relationship and with their opposite sides parallel, a set of dual wheels disposed within the laterally projected confines of the two opposite sides of each channel member with the peripheries of said wheels adjacent to said sides, a separate axle for each of said sets of wheels, an axle mounting support for said axles having an extension projecting above said axle, vertical guides on the inner opposite sides of each channel member, elements on said extension engaging said guides for vertical reciprocable movement of said axle mounting support and consequent vertical reciprocable relative movement of said bed from a lowered position substantially on the ground to an elevated position substantially above the level of said axles, an overhead member rigid with each of said channel members at their upper ends, a hydraulically actuated vertically extensible mechanism within each channel member between each extension and each of said overhead members for moving said bed vertically between a lowered position on the ground and an elevated position substantially above the level of said axles.

2. A vehicle of the character described comprising a horizontal bed, oppositely outwardly opening vertically extending channel members respectively rigidly secured at their lower ends to said bed at opposite points along two opposite side edges of said bed with the bottoms of said channel members in opposed relationship and with their opposite sides parallel, a set of dual wheels disposed within the laterally projected confines of the two opposite sides of each channel member with the peripheries of said wheels adjacent to said sides, a separate axle for each of said sets of wheels, an axle mounting support for said axles having an extension projecting above said axle, vertical guides on the inner opposite sides of each channel member, elements on said extensions engaging said guides for vertical reciprocable movement of said axle mounting support and consequent vertical reciprocable relative movement of said bed from a lowered position substantially on the ground to an elevated position substantially above the level of said axles, an overhead member rigid with each of said channel members at their upper ends, a hydraulically actuated vertically extensible mechanism within each channel member between each extension and each of said overhead members for moving said bed vertically between a lowered position on the ground and an elevated position substantially above the level of said axles.

3. A vehicle of the character described comprising a horizontal bed, oppositely outwardly opening vertically extending channel members respectively rigidly secured at their lower ends to said bed at opposite points along two opposite side edges of said bed with the bottoms of said channel members in opposed relationship and with their opposite sides parallel, a set of dual wheels disposed within the laterally projected confines of the two opposite sides of each channel member with the peripheries of said wheels adjacent to said sides, a separate axle for each of said sets of wheels, an axle mounting support for said axles having an extension projecting above said axle, vertical guides on the inner opposite sides of each channel member, elements on said extensions engaging said guides for vertical reciprocable movement of said axle mounting support and consequent vertical reciprocable relative movement of said bed from a lowered position substantially on the ground to an elevated position substantially above the level of said axles, an overhead member rigid with each of said channel members at their upper ends, a hydraulically actuated vertically extensible mechanism within each channel member between each extension and each of said overhead members for moving said bed vertically between a lowered position on the ground and an elevated position substantially above the level of said axles, springs within said channel members between said overhead members and said extensions for providing a yieldable support for said bed when the latter is elevated above the ground.

4. A vehicle of the character described comprising a horizontal bed, oppositely outwardly opening vertically extending channel members respectively rigidly secured at their lower ends to said bed at opposite points along two opposite side edges of said bed with the bottoms of said channel members in opposed relationship and with their opposite sides parallel, a set of dual wheels disposed within the laterally projected confines of the two opposite sides of each channel member with the peripheries of said wheels adjacent to said sides, a separate axle for each of said sets of wheels, an axle mounting support for said axles having an extension projecting above said axle, vertical guides on the inner opposite sides of each channel member, elements on said extensions engaging said guides for vertical reciprocable movement of said axle mounting support and consequent vertical reciprocable relative movement of said bed from a lowered position substantially on the ground to an elevated position substantially above the level of said axles, an overhead member rigid with each of said channel members at their upper ends, a hydraulically actuated vertically extensible mechanism within each channel member between each extension and each of said overhead members for moving said bed vertically between a lowered position on the ground and an elevated position substantially above the level of said axles, springs within said channel members between said overhead members and said extensions for providing a yieldable support for said bed when the latter is elevated above the ground, each of said extensions including a section removable from a position between said springs to permit lowering said bed to the ground.

5. A freight carrying vehicle having a bed having a forward end and a rear end and formed with a pair of outwardly opening recesses in its side edges at its said rear end and a vertically disposed housing in each recess rigid with said bed and extending upwardly therefrom, a ground wheel in each of said recesses, an individual axle mounting each ground wheel in each corresponding housing, means supporting said bed on said wheels for movement of said bed from a position resting on the ground to an elevated position elevated off the ground supported on said wheels, and vice versa, said housings being in outwardly opening opposed relation and the portion of said bed between said wheels being coplanar with the remainder, said means including an overhead member at a level above said bed and rigid with the latter and a hydraulic cylinder and piston wholly disposed within each housing connecting each of said axles with said overhead member for effecting said movement of said bed upon injection of fluid under pressure into each cylinder and its release therefrom, and means for so injecting said fluid into said cylinder and releasing it therefrom.

ALASTAIR M. MELDRUM.

References Cited in the file of this patent

UNITED STATES PATENTS

| Number | Name | Date |
|---|---|---|
| 318,865 | Burgess | May 26, 1885 |
| 1,393,360 | Harris | Oct. 11, 1921 |
| 1,840,599 | Nibbe | Jan. 12, 1932 |
| 2,002,605 | Kincaid | May 28, 1935 |
| 2,050,471 | Soulis | Aug. 11, 1936 |
| 2,227,762 | Ronning | Jan. 7, 1941 |
| 2,313,877 | Joyce | Mar. 16, 1943 |
| 2,478,795 | Whalen et al. | Aug. 9, 1949 |